United States Patent
Eskildsen

[11] Patent Number: 5,962,839
[45] Date of Patent: *Oct. 5, 1999

[54] APPARATUS PROGRAMMABLE TO PERFORM A USER DEFINED SEQUENCE OF ACTIONS

[75] Inventor: Jørn Eskildsen, Hjortsvang, Denmark

[73] Assignee: INTERLEGO AG, Baar, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/718,068

[22] Filed: Sep. 17, 1996

[51] Int. Cl.⁶ .................................................. G11B 27/28
[52] U.S. Cl. ............................... 235/472.01; 235/462.15; 235/375
[58] Field of Search .................................. 235/472, 462, 235/375, 462.15, 472.01

[56] References Cited

U.S. PATENT DOCUMENTS

| | | | |
|---|---|---|---|
| 4,556,393 | 12/1985 | Bolli | 446/91 |
| 4,721,849 | 1/1988 | Davis et al. | 235/472 |
| 4,825,058 | 4/1989 | Poland | 235/472 |
| 4,831,610 | 5/1989 | Hoda et al. | 369/48 |
| 4,841,132 | 6/1989 | Kajitani et al. | 235/472 |
| 4,868,375 | 9/1989 | Blanford | 235/462 |
| 4,925,424 | 5/1990 | Takahashi . | |
| 5,078,683 | 1/1992 | Sancoff et al. . | |
| 5,097,283 | 3/1992 | Kazumi . | |
| 5,172,314 | 12/1992 | Poland et al. | 364/401 |
| 5,212,368 | 5/1993 | Hara | 235/375 |
| 5,382,776 | 1/1995 | Arii et al. | 235/375 |
| 5,469,291 | 11/1995 | Plesko | 359/224 |
| 5,504,311 | 4/1996 | DuBuis et al. . | |

FOREIGN PATENT DOCUMENTS

| | | |
|---|---|---|
| 0359541 | 3/1990 | European Pat. Off. . |
| 2494873 | 5/1982 | France ................................. 235/472 |
| 2283850 | 5/1995 | United Kingdom . |
| 9117535 | 11/1991 | WIPO . |

*Primary Examiner*—Donald Hajec
*Assistant Examiner*—Douglas X. Rodriguez
*Attorney, Agent, or Firm*—Kane,Dalsimer,Sullivan, Kurucz,Levy,Eisele and Richard, LLP

[57] ABSTRACT

A programmable apparatus for selectively reading machine readable codes, such as bar codes in a user defined sequence. Each code represents an action to be performed by the apparatus. In the apparatus, data representing read codes are generated and stored in a memory. A plurality of such data representing a user defined sequence of actions may be stored. Upon reading stored data, the apparatus can execute corresponding actions in the user defined sequence. Actions to be performed by the apparatus can include: starting, reversing and stopping of an electric motor; increasing and decreasing its number of revolutions; playing tones for generating melodies; and simulating everyday life sounds, such as the sound of a truck engine. The apparatus may be placed in a toy car or truck, in which it senses a tacho disc and synthesizes the sound of the truck's engine with a simulated number of revolutions corresponding to the speed with which the truck is driven.

12 Claims, 2 Drawing Sheets

5,962,839

APPARATUS PROGRAMMABLE TO PERFORM A USER DEFINED SEQUENCE OF ACTIONS

The invention concerns a programmable apparatus for reading and storing machine readable codes in a user defined sequence, each such code representing an action which may be executed by the apparatus, and for executing the user defined sequence of actions. The invention is used particularly, but not exclusively, as a toy which may be programmed to execute a user defined sequence of actions.

BACKGROUND ART

WO 83/02188 discloses a toy in the form of a teddy having an associated bar code reader which can only read one bar code at a time. Having read each individual bar code, the teddy executes a specific action, e.g. pronounces a word or a sentence which is printed on the same piece of paper as the bar code. The toy thus serves as a reading teaching aid.

U.S. Pat. No. 5,212,368 and EP 572 710 both disclose an electronic game which, by means of coded cards may be programmed to play a specific game which is associated with the card and is identified by means of the card. In this context, these games correspond to the above-mentioned teddy.

DE 2 259 915 concerns a model car, the driving of which may be programmed by means of integrated logic circuits.

GB 2 181 066 concerns a corresponding car, but the programming takes place purely mechanically.

All the above-mentioned documents concern devices which may be programmed to execute a specific action such as a game selected by the user from a plurality of possible actions, but none of the devices enables programming and execution of a user defined sequence of actions.

SUMMARY OF THE INVENTION

The invention provides an apparatus by means of which the user can enter a user defined sequence of codes which each represent an action which the apparatus can execute. Once the user defined sequence of codes has been entered, the apparatus may be caused to execute the corresponding sequence of actions. The codes may exist as bar codes on individual code cards or on a sheet of paper having a large number of bar codes, and the apparatus then has an optical bar code reader. Or the codes may be magnetic and be present in a magnetic strip printed individually on code cards or an a sheet having a large number of such codes.

Preferably, optical bar codes are used, there being printed a large number of bar codes on a sheet. Each of these bar codes represents a specific action which the apparatus can execute, and the user can cause the apparatus to read selected codes individually in a sequence selected by the user. Bar codes may contain information on the duration of an action for which a code has been entered. The apparatus may hereby be programmed to control a motor or other electrical equipment, such as a lamp, a relay or a solenoid coupled to an electrical output on the apparatus. Further, the apparatus preferably has a built-in speaker, which may be caused to emit sounds simulating situations of everyday life. Such sounds may comprise the sound of a car engine, machines, animal sounds and tones which may be programmed and played as small melodies.

DETAILED DESCRIPTION OF THE INVENTION

Figure 1:
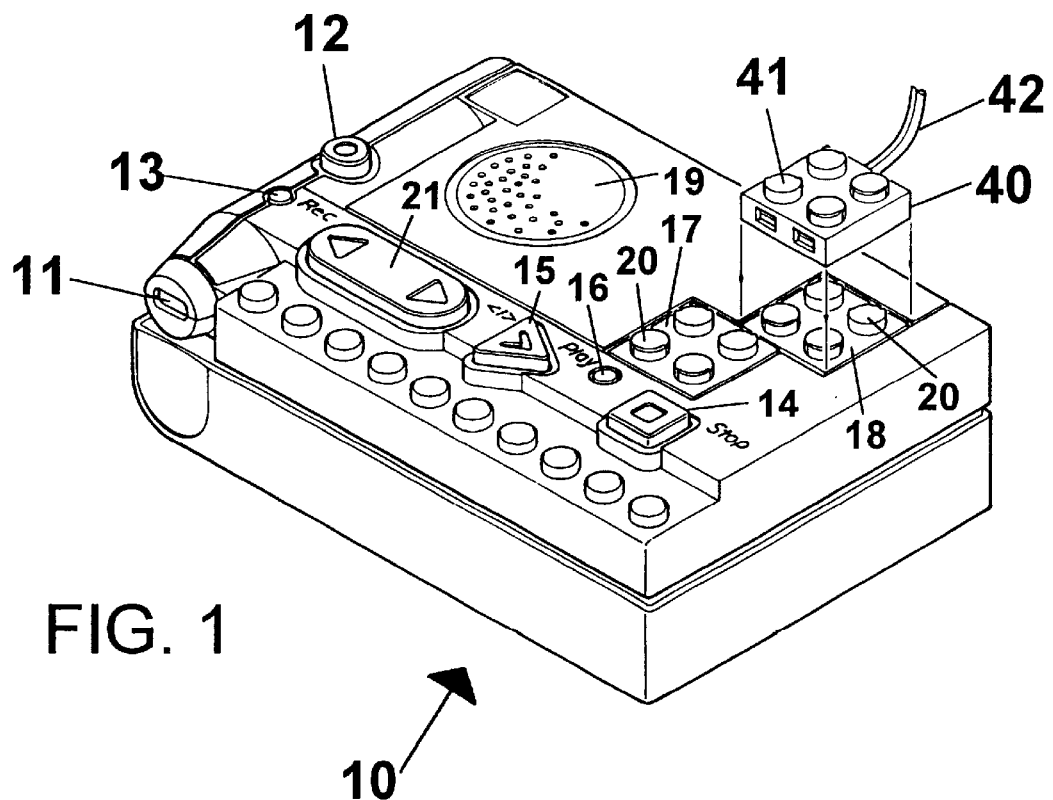
FIG. 1 is a perspective view of an apparatus of the invention.

FIG. 1 shows a programmable apparatus 10 according to the invention. The apparatus 10 has a size which makes it suitable to be held by hand.

The apparatus 10 has a housing with an opening in which an optical read device 11 is present. The optical read device functions in a known manner in that a light source in the read device emits light toward an object with information to be read by the read device. The light source may expediently be a light emitting diode (LED) which emits visible light. The use of visible light is an advantage, since the user then gets a visible indication of whether the apparatus operates, but also invisible light in the infrared or ultraviolet region may be used.

Figure 2:
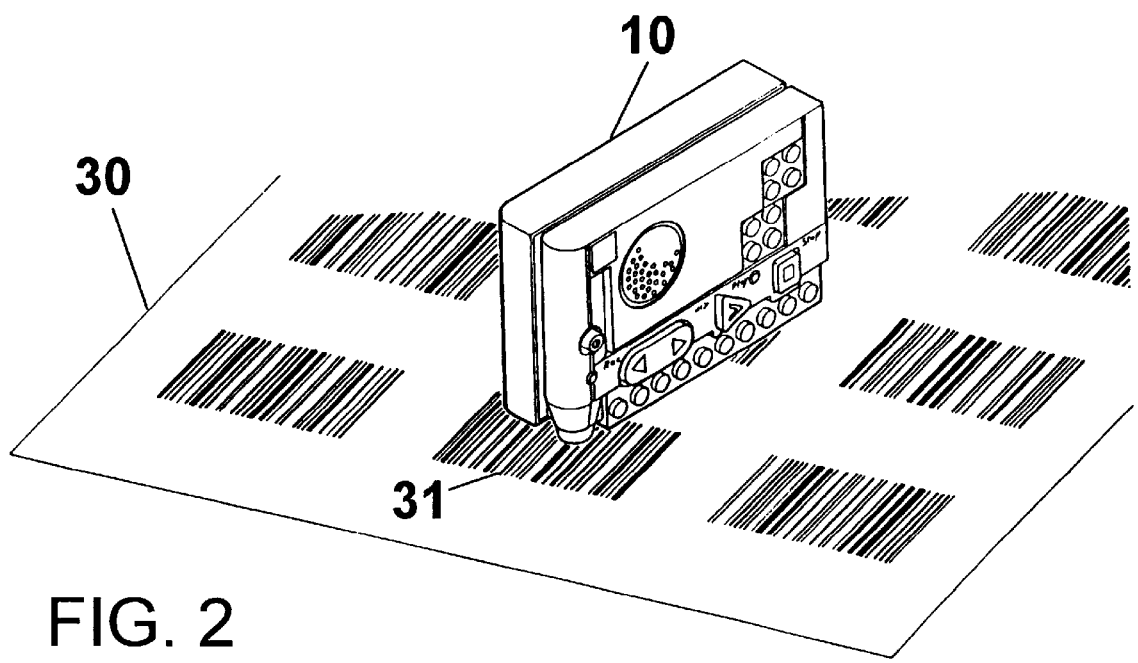
FIG. 2 shows the apparatus of FIG. 1 where the apparatus reads bar codes on a sheet of paper, and FIG. 3 schematically shows a block diagram of an apparatus of the invention.
Figure 3:
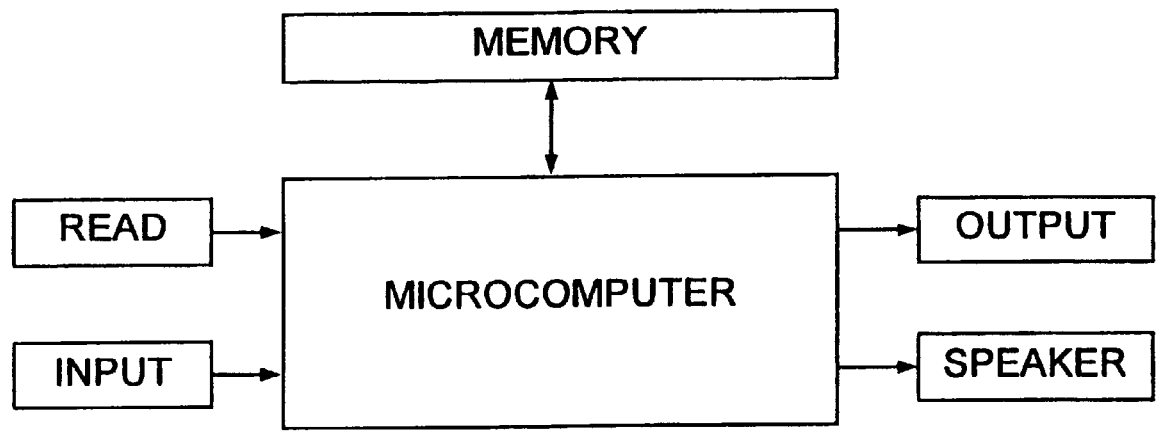

For bar codes to be read, the user must press a record button 12, causing an LED 13 to emit red light to indicate to the user that the apparatus is in receive mode. Then the apparatus is placed as shown in FIG. 2 with the read device 11 close to a bar code 31, which is here shown on a sheet of paper 30 or the like together with other bar codes.

Light from the light source impinges on the bar code 31, and as the apparatus is moved across the bar code 31, light from the light source will be reflected with a light intensity modulated corresponding to dark bars of the bar codes with light spaces, where both bars and spaces may be of different widths. The read device moreover has a light-sensitive component, such as a phototransistor which receives reflected light from the bar code. The intensity modulation in the received light will be converted in the phototransistor into an electric signal having a corresponding modulation. The electric signal is processed by a microcomputer in the apparatus and is stored in a memory as data which correspond to the read bar code.

The bar codes on the sheet 30 are different and preferably have their respective markings (not shown) which identify the bar code concerned for the user and indicate a specific function or action which the apparatus can execute. The microcomputer of the apparatus is programmed to recognize and identify each individual one of the bar codes on the sheet 30, and when reading bar codes, the microcomputer generates individual data for each read bar code and stores these data in the read sequence.

The user may enter several bar codes in a user defined sequence. This is done by moving the read device of the apparatus across selected bar codes one at a time, while the apparatus is in record mode. The user may hereby make up an individual program of actions to be executed. When the user has entered the desired sequence, he presses a stop button 14. The entire sequence is then stored in the memory of the apparatus, and the red LED 13 is turned off.

To execute the entered sequence, the user presses a play button 15, and the apparatus then switches to play mode, which is indicated in that a green LED 16 gives out light. The microcomputer of the apparatus will hereby read the entered data one at a time from the memory. The memory also stores instructions corresponding to each of the possible bar codes. The microcomputer can perform these instructions in the order which corresponds to the entered user selected sequence, thereby causing the apparatus to execute the corresponding actions in the user selected sequence.

The apparatus has two electrical connections 17, 18 and an incorporated speaker 19. The electrical connections 17 and 18 have four electrical terminals 20 each, by means of which peripheral electrical devices may be connected to the apparatus 10. This may be done by means of an electrical connector 40 with an associated lead 42. The connector 40 has four electrical terminals on its upper side which are substantially identical with the terminals 20 on the apparatus 10, and the connector 40 has other electrical terminals (not shown) on its underside which are complementary to the terminals 20 and may be coupled to these to form an electrical connection from the terminals 20 of the apparatus to the lead 42. At the other end (not shown) the lead 42 is connected to an electrical consumer, such as a motor, a lamp or other electrical equipment, which will perform one or more functions when power is fed through the lead.

It will be seen that the apparatus has two electrical connections 17, 18, which are described in U.S. Pat. No. 4,556,393 These connections may both be outputs to supply electrical devices with energy, or one or both may be an input for connection of an electrical sensor, e.g. a pushbutton for remote control of one or more functions of the apparatus, a transducer to convert a physical quantity into electric signals, and the apparatus may be adapted to perform one or more actions conditional upon the state of such an input signal, or the apparatus may be programmed for this by reading of an associated bar code.

With bar codes adapted for the purpose, the voltage on the output terminals 20 may be programmed to assume various fixed values or a varying value, and the polarity of the voltage may be reversed. An electric motor coupled to the output concerned will hereby be controlled to different or varying numbers of revolutions, and the direction of rotation of the motor may be reversed.

The speaker 19 of the apparatus may be programmed by the user to emit various sounds which may be synchronized with electric signals on the output 17, 18. For example, the apparatus may be programmed to emit the sound of e.g. a car engine through the speaker 19, said sound corresponding to the number of revolutions of an electric motor coupled to one of the outputs 17, 18.

Figure 4:
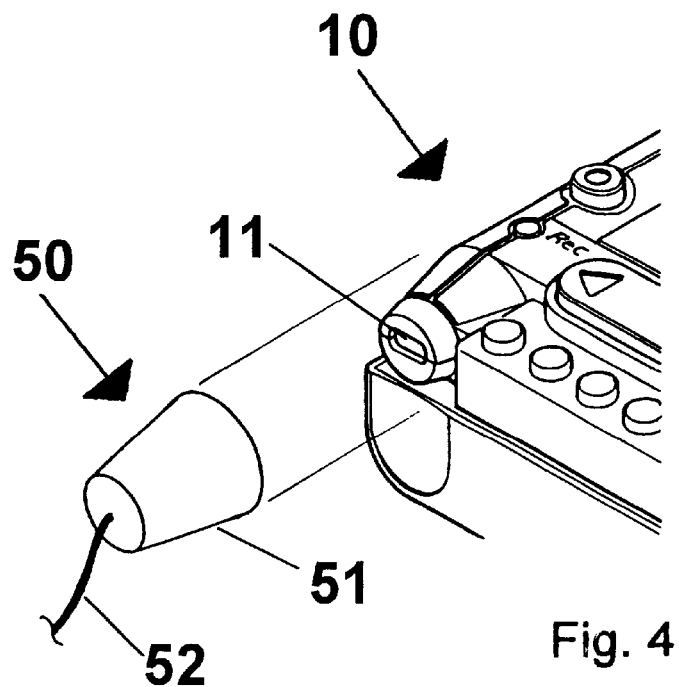
FIG. 4 is a perspective view of part of the apparatus in FIG. 1 together with an optical signal source for delivering optical signals to the apparatus.

The apparatus 10 has a left/right button 21 which operates independently of any received and stored sequences of bar codes. The button 21 is deactivated in the neutral position, and it may be tilted to both sides, where one or both electrical connections 17, 18 are activated as outputs. In one of the two active positions of the button 21, the output 17, 18 concerned has the opposite electrical polarity of the other position. A connected motor may hereby be driven in both directions with the left/right button 21, and such a manually executed sequence may be stored in the memory of the apparatus together with data generated by entering bar codes and will thereby form part of this user defined sequence of actions, which the apparatus can subsequently execute. FIG. 4 shows a section of the apparatus 10 of FIG. 1 together with an optical signal source 50. The signal source 50 has a housing 51 which contains a light source, such as an LED. The housing 51 of the signal source has a shape which is adapted to be placed over the read device 11 so that the light source is directly opposite the phototransistor of the read device. Further, the housing 51 excludes light from the surroundings. The signal source has a lead 52 by means of which the LED may be connected to an electrical source, which may e.g. be controlled from a computer.

When the signal source 50 is mounted on the read device of the apparatus and connected to a suitably programmed computer, the computer can emit sequences of electrical pulses which are converted into light pulses by the LED. These light pulses are received by the phototransistor of the read device in the same manner as light which is reflected and intensity-modulated by a bar code.

By means of the optical signal emitter connected to a computer, sequences of codes user defined on the computer may be downloaded from the computer to the apparatus 10. Further, it is also possible to perform more basic programming of the apparatus, it being possible to introduce entirely new instructions for completely new functions and actions. These may comprise sound signals and fixed combinations of several actions.

When reading bar codes on the sheet, the apparatus may execute the functions concerned immediately thereafter, such as generating a synthesized sound signal in the speaker. This sound signal may be tones of different pitch, thereby allowing melodies to be played. One of the bar codes on the sheet 30 and the associated instruction in the memory of the apparatus will cause the read device to be active when the apparatus is in play mode, and such a code may cause the synthesized sound played by the speaker to change its nature in response to the frequency of the optical pulses received by the phototransistor of the read device. This sound may be the sound of an engine, such as the diesel engine of a truck. When no optical pulses are fed to the phototransistor, the sound of an idling engine will be synthesized, and with increased pulse frequency the sound of an engine having a correspondingly higher number of revolutions will be synthesized. When predetermined frequencies of received light pulses are exceeded, the synthesized sound may simulate a change of gears.

This function may be used to particular advantage in toy cars in which a "bar code" in the form of uniform bars with uniform spaces on a tacho disc is provided e.g. on one of the wheels of the car or on a part which rotates in response to the wheel. The apparatus 10 may be placed in the car with its read device in read position opposite this tacho bar code, which per se does not contain any specific information, but when the tacho bar code passes the reader device of the apparatus, bars of a frequency proportional to the speed of the car will be read, and the read device will hereby generate an electric tacho signal which is supplied to the microcomputer. In response to the electric tacho signal, the microcomputer synthesizes a signal which simulates the sound of an engine having a number of revolutions corresponding to the tacho signal and thus the speed of the car.

Thus, an apparatus has been provided which may be placed in toy cars and synthesize and play realistic sounds which simulate the sound of an engine corresponding to the speed of the car in which the apparatus is placed.

The invention is described here with the use of bar codes, which is the preferred embodiment, one reason being that bar codes are simple to produce and optionally reproduce, while being stable and relatively insensitive to external influences. Furthermore, it can easily be seen whether a bar code is damaged.

Other forms of codes may also be sued, such as magnetic codes stored in magnetic strips. However, these are more expensive both to produce particularly to reproduce. This involves the advantage that also unauthorized copying of code sheets is impeded and thereby significantly reduced.

The apparatus 10 may be provided with a very large number of instructions for actions which the apparatus can execute, and the apparatus may form part of sales units. It is therefore expedient that the apparatus contains instructions on all actions and functions which each individual one of the sales units must be capable of performing. The individual sales unit may then expediently contain code sheets having codes for precisely the functions which the apparatus in the sales unit concerned must be capable of performing. This moreover opens up the possibility of supplementing sold units with quite few new elements and new code sheets with codes for actions, for which the instructions are already contained in the apparatus of the invention, without the customer having to buy a new apparatus in order to have supplementary functions as well.

What is claimed is:

1. A programmable apparatus comprising:

reading means for selectively reading a plurality of machine readable codes in a user defined sequence, each of said codes representing an action to be selectively performed by the apparatus, microcomputer means for generating data representing said codes read by said reading means, storage means for storing a plurality of data from said microcomputer means, said plurality of data representing the entire user defined sequence, a plurality of selectively executable instructions, each of said instructions corresponding to a respective one of said actions, the apparatus being adapted, when any one of said instructions is selectively executed, to perform said action corresponding to said instruction, said microcomputer means being adapted to selectively read, from said storage means, said plurality of data representing said entire user defined sequence, and to select, from said plurality of instructions, a plurality of instructions corresponding to said entire user defined sequence, and to execute said plurality of instructions corresponding to said entire user defined sequence, thereby causing the apparatus to perform a sequence of actions corresponding to said user defined sequence.

2. An apparatus according to claim 1 wherein said machine readable codes are optically readable bar codes.

3. An apparatus according to claim 1 wherein said machine readable codes are magnetically readable codes stored in a magnetic strip.

4. An apparatus according to claim 1 including a speaker and means for generating electric signals to said speaker to make said speaker output acoustic signals.

5. An apparatus according to claim 4 wherein said acoustic signals include signals simulating real life situations.

6. An apparatus according to claim 1 including an electric output for electric signals.

7. An apparatus according to claim 6 wherein said electric signals can be reversed.

8. An apparatus according to claim 1 including pushbuttons for operating the apparatus.

9. An apparatus according to claim 1 including input means for receiving signals for operating the apparatus.

10. An apparatus according to claim 9 including a speaker and means for generating electric signals to said speaker to make said speaker output acoustic signals, and wherein the nature of said acoustic signals can be selectively varied in response to received signals for operating the apparatus.

11. An apparatus according to claim 1 including a selectable record mode of operation allowing the reading of said machine readable codes in a user defined sequence, whereby said microcomputer means generates said data representing said codes read by said reading means and stores said data in said storage means.

12. An apparatus according to claim 1 including a playback mode of operation allowing said microcomputer means to read said plurality of data from said storage means, and selecting said sequence of instructions corresponding to said user defined sequence and executing said instructions, whereby the apparatus performs a sequence of actions corresponding to said user defined sequence.

* * * * *